(12) United States Patent
Vidich et al.

(10) Patent No.: US 7,206,766 B2
(45) Date of Patent: *Apr. 17, 2007

(54) METHOD AND APPARATUS FOR DISTRIBUTING MULTIMEDIA PROGRAMS

(75) Inventors: Paul Vidich, New York, NY (US); Kevin Gage, Katonah, NY (US)

(73) Assignee: Warner Music Group, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/280,893

(22) Filed: Nov. 16, 2005

(65) Prior Publication Data

US 2006/0069651 A1   Mar. 30, 2006

Related U.S. Application Data

(63) Continuation of application No. 10/077,549, filed on Feb. 15, 2002, now Pat. No. 6,993,509.

(51) Int. Cl.
*G06Q 99/00* (2006.01)

(52) U.S. Cl. .................. 705/51; 380/200; 369/30

(58) Field of Classification Search .......... 705/50–59; 380/200–203, 230–234; 369/30; 710/74; 711/147–153, 170–173; 709/213–215
See application file for complete search history.

(56) References Cited

U.S. PATENT DOCUMENTS

| | | | | |
|---|---|---|---|---|
| 5,778,257 A | * | 7/1998 | Tsukatani et al. | 710/74 |
| 5,825,726 A | * | 10/1998 | Hwang et al. | 369/30.05 |
| 6,047,292 A | * | 4/2000 | Kelly et al. | 715/716 |
| 6,154,427 A | * | 11/2000 | Yokota et al. | 369/59.21 |
| 6,283,764 B2 | * | 9/2001 | Kajiyama et al. | 434/307 A |
| 6,446,073 B1 | * | 9/2002 | D'Amato et al. | 707/101 |
| 6,515,212 B2 | * | 2/2003 | Taira et al. | 84/609 |
| 6,993,509 B2 | * | 1/2006 | Vidich et al. | 705/51 |

FOREIGN PATENT DOCUMENTS

WO    WO 2075735 A1 * 9/2002

OTHER PUBLICATIONS

Young, "Standard Fuels CD-ROM Acceptance", Computer Technology Review, v12n4, pp. 18, Apr. 20-21, 1992, ISSN: 0278-9647.*

* cited by examiner

*Primary Examiner*—Mary D. Cheung
(74) *Attorney, Agent, or Firm*—Gottlieb, Rackman & Reisman P.C.

(57) ABSTRACT

Distribution of audio and other multimedia content is accomplished by generating a multimedia session consisting of at least one multimedia program, generating a data session consisting of digital files including at least one software player program and a digital compressed file corresponding to the multimedia program; and distributing the multimedia and data sessions to consumers. The consumers can selectively play the multimedia program from said multimedia session through a player device, and through a computer by using the software player program to manipulate the compressed file. In one aspect of the invention, the multimedia and data sessions are recorded on a physical medium, such as a CD or DVD, and the medium is then distributed. In another aspect, the sessions are combined and transmitted electronically. The data session can include information associated with the multimedia content, in the form of text and graphic files.

22 Claims, 4 Drawing Sheets

Two-Session CD Capacity

| | | | | |
|---|---|---|---|---|
| CD Audio Runtime (minutes) | 56 | 60 | 62 | 64 |
| Total CD Capacity (minutes) | 76½ | 76½ | 76½ | 76½ |
| Multi-Session Gap (minutes) | 2½ | 2½ | 2½ | 2½ |
| 2nd Session Capacity (minutes) | 18 | 14 | 12 | 10 |
| 2nd Session Capacity (MB) | 162 | 126 | 108 | 90 |
| EMD Compressed Audio (MB) | 56 | 60 | 62 | 64 |
| SW Players (MB) | 15 | 15 | 15 | 15 |
| Text Data (MB) | 0.5 | 0.5 | 0.5 | 0.5 |
| Graphics Capacity (MB) | 90.5 | 50.5 | 30.5 | 10.5 |
| Graphics per Disc (Track)* | 1064(76) | 594(42) | 358(25) | 123(8) |

FIG. 3

METHOD AND APPARATUS FOR DISTRIBUTING MULTIMEDIA PROGRAMS

RELATED APPLICATIONS

This application is a continuation of U.S. patent application Ser. No. 10/077,549 filed on Feb. 15, 2002, now U.S. Pat. No. 6,993,509 incorporated herein by reference.

BACKGROUND OF THE INVENTION

A. Field of Invention

This invention pertains to pertains to a method and apparatus for distributing multimedia programs in multiple sessions on a single disk, including one session consisting of programs in a format readable only by a suitable player device, and a second session consisting of digital files in a format readable only by a PC, this second session including a compression versions of the programs. The second session may also include graphic and/or text files with content associated with the programs and a dedicated software player program that manages and controls the digital files and the manner in which they are played and/or copied. The invention is applicable to the distribution of audio, as well as video programs.

B. Description of the Prior Art

Programs, including musical selections and other audible and visual content, are sold and distributed using means including CDs, DVDs and other similar physical or electronic media. Until recently, there was no equipment available to would permit an average consumer to duplicate the contents of one CD on another CD and, accordingly, CDs were considerate to be safe from unauthorized copying. However, advances in computer technology resulted in relatively inexpensive software which made copying CDs a very easy and inexpensive procedure. Hence, unauthorized copies of many CDs are made all over the world, resulting in tremendous losses of revenue to the CD producers.

A further problem facing CD producers pertains to the widespread use of the Internet. Originally, the average Internet user had to rely on a dial-up connection which did not have a sufficient bandwidth for the transmission of CD-quality audio programs. However new compression schemes have been developed that are capable of reducing the size of digital audio files substantially. In addition, broadband Internet connection means (including cable and DSL connections) have become widely available as well, These developments allow users to "rip" audio programs from CDs, compress them and transmit the compressed files over the Internet, using, for instance, peer-to-peer networks. This also led to wide-spread unauthorized copying and distribution audio programs from CDs.

Various schemes have been suggested to prevent unauthorized copying and distribution of audio programs. For example, the CDs can be encoded in such a manner that they cannot be read by a standard computer, such as a PC, but can be played on a standard CD player. One such scheme is called MediaCloq™ and is available from SunnComm, Inc. of Phoenix, Ariz. (See www.sunncomm.com). However, some consumers who have bought a CD want to transfer its contents on their PC so that they can listen to the audio programs either on their the PC and/or copy the programs to small personal audio players adapted to play store these audio programs as digital files on a solid state memory and to play the audio programs by decompressing the digital files.

Enhanced CDs are also known that provide two sessions audio programs in two sessions on a single medium, such as a CD, one session including the audio programs having a format readable only by an audio player device and the second session having digital files in a format readable only by a general purpose computer such as a PC. The second session includes digital files including compressed versions of the audio programs and additional files containing text and/or graphic elements. The additional digital files can include information about the various musical selections on the CD, the artists who recorded the musical selections, lyrics, pictures associated with the CD and its artists, and so on. However, the second session is encoded and formatted so that it can be read using only certain, usually proprietary software, such as Microsoft's Windows Multimedia Audio program.

Enhanced CDs are not satisfactory because their second session can be read only if the specific player software has been installed on their computer. Since there are several competing such software players available, the consumer can take advantage of the digital files of the second session only if he has the appropriate software player program installed on his computer. More importantly, at least from the point of view of the PC producers, the enhanced CDs still do not solve the problem of unauthorized copying.

These problems are also applicable to the distribution of other multimedia programs such as videos and the like.

OBJECTIVES AND SUMMARY OF THE INVENTION

An objective of the present invention is to provide a method of distributing multimedia programs on CDs, DVDs and other similar media in a manner that eliminates unauthorized copying of their contents.

A further objective is to provide an electronic music distribution (EMD) system with a standard, architecture so that it can be used on an industry-wide basis.

Yet another objective is to provide an EMD system that is user-friendly.

A further objective is to provide a system adapted to handle multimedia files on a media such as a CD, as well as electronically transferred multimedia files without any major design or hardware changes.

Other objectives and advantages of the system will become apparent from the followng description of the invention.

The invention is now described as it applies to the distribution of audio files, it being understood that the same methodology and hardware may be used for multimedia files as well. Briefly, distributing content in accordance with this invention is accomplished by generating an audio session consisting of at least one audio program;

generating a data session consisting of digital files including at least one software player program and a digital compressed file corresponding to the audio program; and distributing the audio and data sessions to consumers. The consumers can selectively play the audio program from said first session through a player device, and through a computer by using the software player program to manipulate the compressed file. In one aspect of the invention, the audio and data sessions are recorded on a physical medium, such as a CD or DVD, and the physical medium is then distributed.

In another aspect of the invention, the two sessions are combined into a composite file. The composite file is then transmitted electronically, for example, over the Internet, to the consumers.

Preferably, the audio session is encrypted to render it undecodable by a general computer.

Preferably, the digital compressed file is encoded so that it must be decoded by a general computer before it can be played.

The software program is used to decode the compressed digital file and to control the manner in which the compressed digital file is to be copied. Using the software player, the digital file can be copied either to the memory of the general computer, or to a portable (i.e., Rio-type) digital player. The software player maintains a count of how many times the compressed digital file is copied to either the memory of the general computer or the portable device. The compressed digital file cannot be copied in a memory if it is has been copied previously.

The data session also includes information files, including text and/or graphic files with information associated with the respective audio content. For example, the information may include a table of contents, biographical information about the composers, or artists, and so on.

BRIEF DESCRIPTION OF THE DRAWINGS

FIG. 3 shows a table indicating how a CD is partitioned into two sessions depending on the total length of the audio programs.

DETAILED DESCRIPTION OF THE INVENTION

In the following description, the invention is descried as it applies to the distribution of audio content. However, it is equally applicable to the distribution of videos and other multimedia programs with audio-visual content, and accordingly the term "audio" is to be interpreted wherever possible to cover "multimedia" as well.

Figure 1:
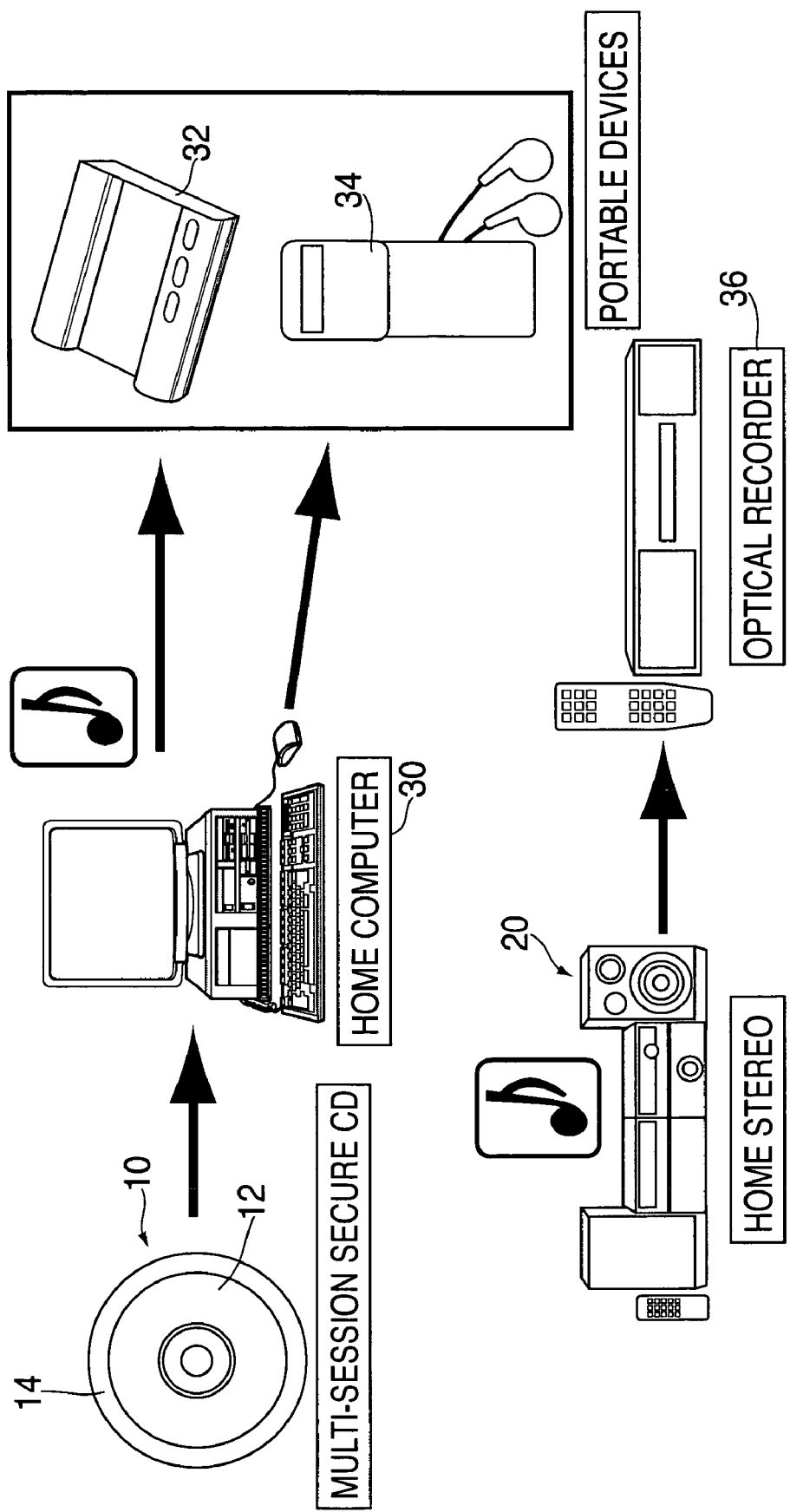
FIG. 1 shows a method of distributing a multi-session CD in accordance with this invention.

Referring first to FIG. 1, audio content has been recorded on a medium such CD 10, using at least two sessions: an audio session containing audio programs and recorded on a portion 12 of CD 10, and a data session containing digital files and recorded on a portion 14. The primary function of the CD 10 is to play the audio programs on the audio session on a standard CD player 20. Hence, normally most of the CD 10 is devoted to the first or audio session, and the second session is substantially smaller, as discussed in more detail below, in conjunction with FIG. 3. Moreover, while in FIG. 1, disk portion 12 with the audio session is shown radially inwardly of portion 14, it should be understood that other arrangements may be possible as well.

The audio programs of the audio session are in a standard format such as linear pulse code modulation, Dolby Digital (AC-3) or meridian lossless packing (MLP) format using the specifications adopted by the music industry and known as the Red book CD audio specification. Preferably, the digital audio files are encoded, using MediaCloq, or other similar schemes which render the digital audio files invisible to a PC. When the CD 10 is inserted into a standard audio player device 20 (such as a home stereo system) a user can activate the player device 20 to play the respective audio programs in the normal manner.

The data session consists of several digital files including a player software program, one or more compressed audio files corresponding to the audio programs of the audio session, and information files containing data related to the audio files. The compressed audio files contain the same musical selections as the digital audio files, but in a different format. For example, the compressed audio files may be in an MP3 or ATRAC3 format. The compressed audio files are also preferably encrypted so that they must be decrypted before they can be played. The information files may include text similar to the text found on CD or LP album covers. Thus, the text may include a table of contents, descriptions of the musical selections, biographical information about the artists and composers, details of how and/or where a recording was made, the lyrics, etc. The information files may also include pictures and/or video clips of the artists.

FIG. 3 shows how a standard 76½ minute CD can be partitioned into two sessions so that the audio session can accommodate audio program having different durations. In each case, the sessions are separated by a session gap of 2½ minutes. The first column of FIG. 3 shows how the CD is partitioned to accommodate an audio session with audio programs having a duration of 56 minutes, leaving 18 minutes corresponding to 162 Mb for the data session. This space can be allocated as follows: 56 Mb for compressed and encoded audio files (in MP3, ATRAC3 or any other similar formats); 15 Mb for the software players; 0.5 Mb for text data and 90.5 Mb for graphic data. The allocated graphic data is sufficient for 1064 pictures at 85 Kb/picture. This allocation is based on using a high quality copy protected compression scheme at encoding rate of 128 Kbps encoding rate. The remaining columns shown possible allocations for audio programs lasting 60, 62 and 64 minutes respectively.

Returning to FIG. 1, the CD 10 can also be inserted into a general computer such as a home computer 30. In the prior art, the home computer could not play the compressed audio files on the CD unless it had a compatible player software. This problem is solved in the present invention by providing, preferably as part of the data session, a software player that is compatible with the compressed audio files of CD 10. The software player is preferably self-executing when the CD is inserted into the home computer 30 and may be used to control the copying of the compressed audio files, and to display the information files described above. The software player must be compatible with the operating system of the PC 20. Therefore, several versions of the software player may be provided, each version being suitable for a particular operating system (i.e., Windows, Apple, Linux, etc).

When the CD 10 is inserted into the home computer, the respective software player is automatically downloaded into the home computer 30 and is executed or initialized. The software player then preferably provides a menu to the user listing a number of various operations that can be performed by the computer 30 using the data files. For example, the text and graphics may be downloaded and displayed to the user on the screen of the home computer 30.

Alternatively, if the user so elects, the compressed audio files are decompressed, decoded and played. However, this software player is adapted insures that the compressed audio files are downloaded only once and that they are not copied on another CD.

Figure 4:
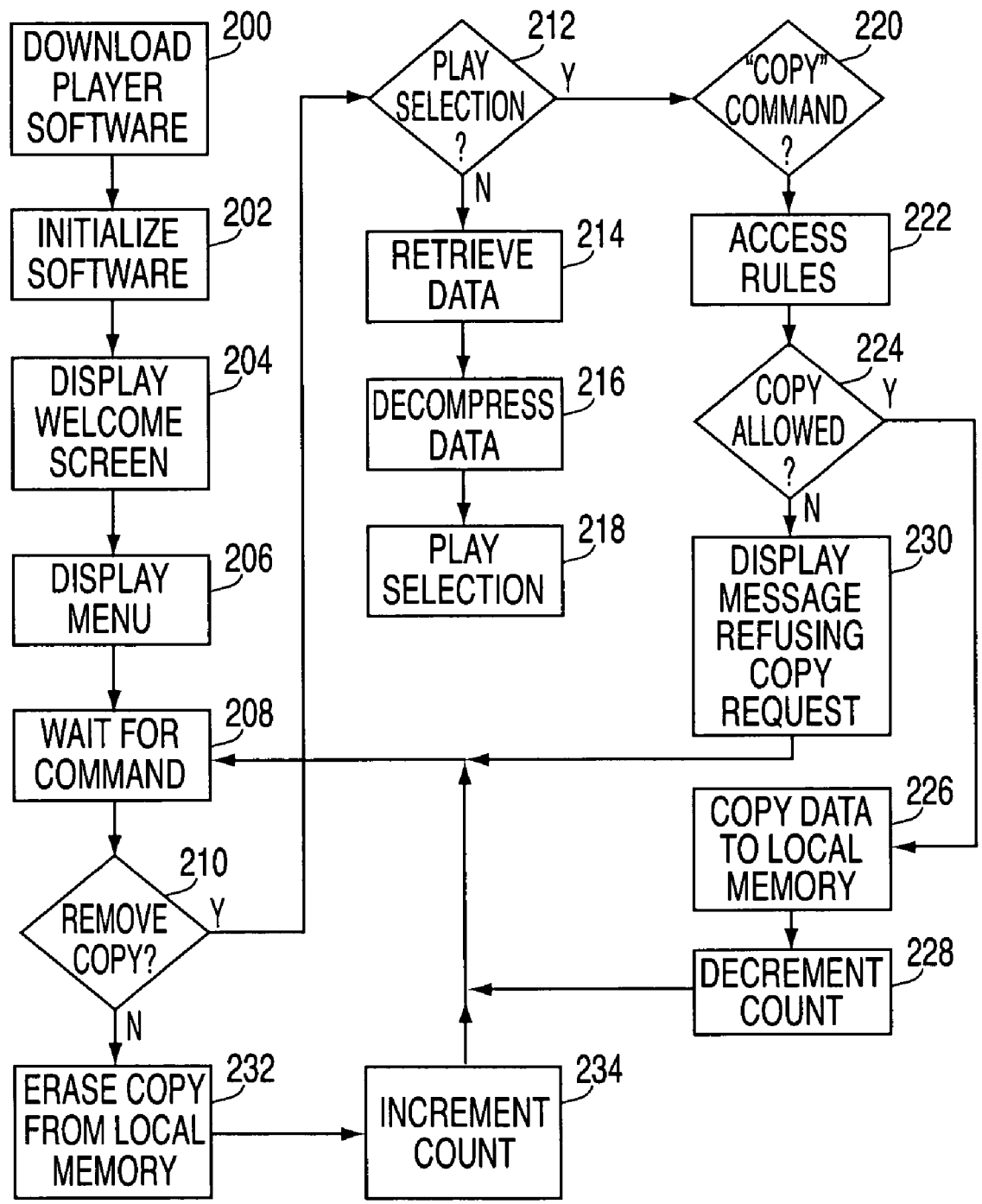
FIG. 4 shows a flow chart indicating the operation of a software player in accordance with this invention.

The operation of the software player is shown in more detail in FIG. 4.

In step 200 the software player is downloaded.

In step 202 the software player is executed or initialized so that starts up automatically.

In step 204 a welcome screen is displayed to the user indicating various information such as title, artist, composer, production company, and so on. Information about other titles available from the company, may also be displayed.

In step 206 a menu is displayed indicating to the user the various functions available from the CD.

In step 208 the software player waits for a command. During this time information from the information files may be continuously displayed.

When a command is received, a test is performed in step 210 to determine if the command is a remove copy command. This command is explained in more detail below. If it is not, then in step 212 a test is made to detect a play selection command. The play selection command can specify a particular program on the disk, or may be a general play command to play all the programs in a particular sequence.

In step 214 the compressed file corresponding to the selection is retrieved. If all the selections are requested, then the first compressed file may be retrieved followed by all the remaining files in sequence. Depending on the size of the files and the particular operating system and the configuration of the software player, all the files can be retrieved in step 214, or, alternatively, only a portion of the file may be retrieved, as desired.

In step 216 the compressed file is decompressed, decrypted and converted into an analog file that can be played in step 218 over the speakers associated with the home computer 30.

A copy command is recognized in step 220. In response to this command, in step 222 a set of rules is accessed. Preferably the rules are stored on the data portion of the CD. These rules are used to determine if the home computer 30 is allowed to make a copy of a particular compressed files. In step 224 a check is performed to determine if a copy function is allowed by the system. This decision depends on a set of rules which take into consideration a number of factors, normally selected by the CD producer, such as whether the copy is to be stored on the home computer or an external device, the number of copies previously made on the home computer 30, etc. Preferably, the external devices are devices 30, 32 that have a solid state digital, or other kinds of memory used to store digital audio files.

As discussed above, the compressed audio files are encrypted so that if they are copied directly to another media, such as the hard drive of the home computer 30, or an external device 32, 34, i.e., by bypassing the software player, the copy is useless and cannot be played. For example, device 32 may be a standard MP player with a hardwired solid state memory while device 34 may be an player or other similar device in which compressed audio files are stored on a replaceable memory stick.

The software player can be adapted to allow copying of any compressed file on the hard drive only once, and to allow copying of compressed files to any external devices only up to three times. Of course these numbers can be changed by the CD producer.

Getting back to FIG. 4, when a command is received to copy one or more compressed files, as part of step 224 a check is performed to determine whether the rules allow the designated compressed file or files to be have been copied. If not, then in step 226 the requested file or files are decoded and then copied on either the hard drive or the respective external device. In step 228 a counter (not shown) designated for a respective device or memory (i.e., either the memory of the home computer 30, or the devices 32, 34) is decremented. The software player then waits for the next command.

If in step 224 it is found that the rules do not allow the requested copying (for example, if the designated counter has reached a certain limit) then in step 230 a message is displayed to the user indicating that the request has been refused and the software player then waits for the next command.

Going back to step 210, because the number of copies that can be made is limited, a mechanism is provided that allows a user to 'remove' a copy of the compressed file from a respective device. When a command to remove a copy from the hard drive or an external device is received in step 210 then in step 232 the software player erases the copy of the designated file from the respective device(i.e., either the memory of home computer 30 or one of the devices 32, 34). In step 234 the counter for the respective device is incremented. More specifically, if the counter indicates that a particular compressed file has been copied twice to one of the devices 32, 34 and only three such copies are allowed by the rules, then the counter for the respective devices shows a "1". After the compressed file is removed, the counter is incremented to a value of "2".

In the above discussion, the medium on which the audio content is recorded is a CD. Obviously, other media can be used including DVDs, DAT, etc., and, correspondingly, a different hardware player must be used, such as an optical recorder 36.

Figure 2:
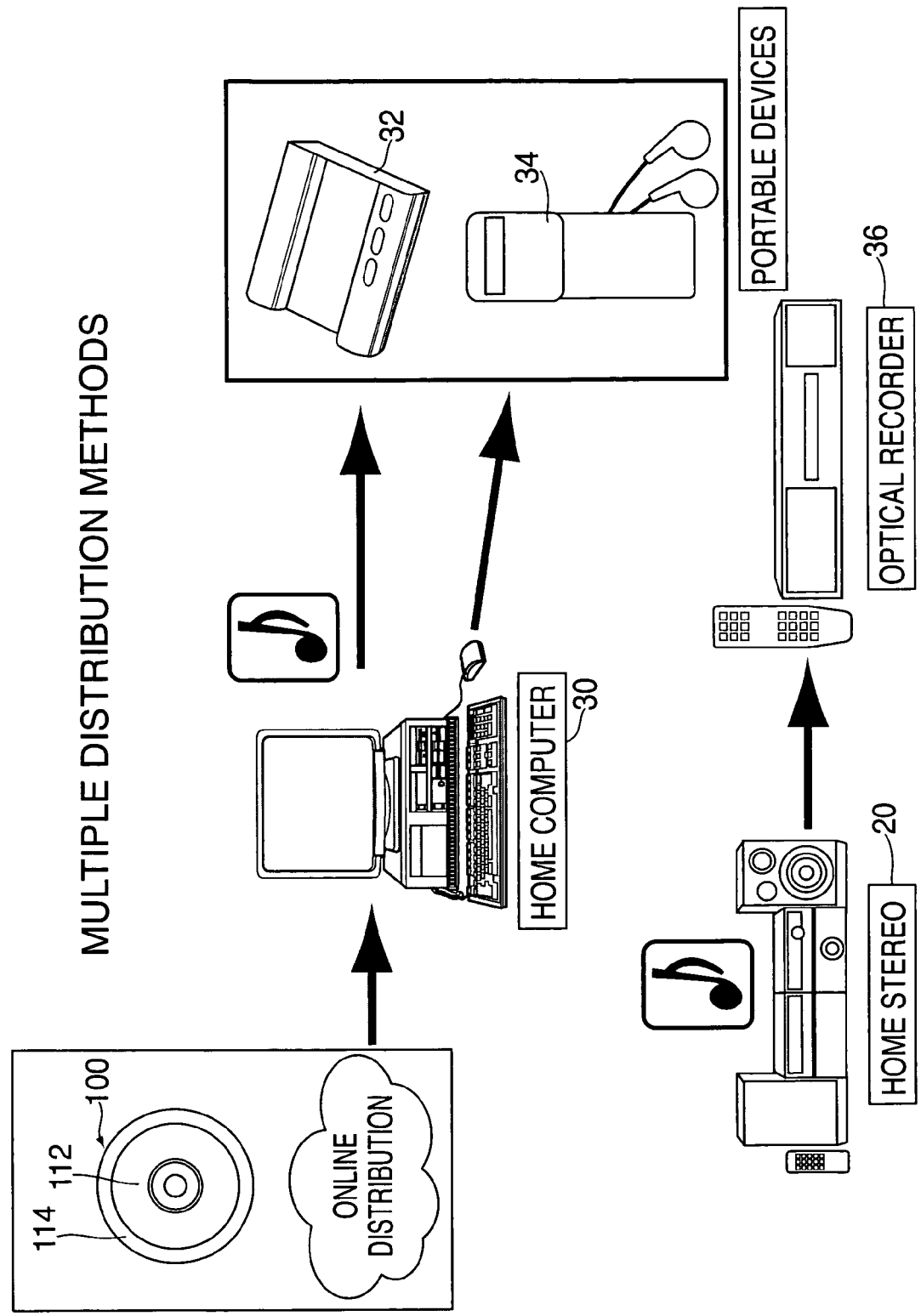
FIG. 2 shows a method of distributing audio content electronically over a distributed computer system, such as the Internet.

FIG. 2 shows an alternate embodiment of the invention. In this embodiment, audio programs are converted into a composite file with two file portions corresponding to the audio and data sessions as discussed above. In other words, the audio programs are converted into a composite file having a format similar to the CD 10. This file may be considered a virtual CD which is distributed not as a physical object but as a file over a computer network, such as the Internet. Once it is received or downloaded by a user, the virtual CD can be fed to either a hybrid player device such as a home stereo system 120 (which must have the capability of receiving such files) or to a home computer 130. Once downloaded, the virtual CD operates in the same manner as the CD 10 discussed above.

Using this method of distributing audio programming achieves several objectives. It reduces or eliminates the so-called "CD problem" because CDs produced by this method cannot be "ripped" and then replayed.

The method can be accomplished by using and encouraging an open architecture for a secure electronic music distribution. The architecture includes the use of standardized formats including formats for Codecs, copy protection and file formats. The same method can be used for both media and online distribution. The method incorporates software that can be used automatically on any operating system and platform, including PCs, MACs, PALM and CE hand-held devices, and portable players.

The method provides a means by which a user can listen to audio directly either on a standard device, including CD players, DVD players, recordable DVD players, secure CD-R, etc. Alternatively, the user can make high quality copies on a computer or portable devices any kind of memories, including flash cards.

Incorporating the software player into the media insures that the user has the right software for the audio content. Moreover, one issue that often arises with software players, is that, these players are updated frequently, and they are not always backward compatible. With the present method, the correct player is always bundled with the audio content, and software upgrades are immaterial.

The open architecture allows a CD producer to bundle any software player with his audio content. Accordingly, any software company can develop its own player, as long as it is capable of performing the functions discussed above.

The method further allows a CD owner to decide on its own how copies are made. For example, when the same audio content is distributed electronically and on CDs, the CD producer may decide to allow separately how many copies to allow from the CD and how many copies to allow when the content is downloaded on line. Moreover, the CD producer is free to change the rules for each CD released.

The invention is applicable to multimedia content which includes control tags that identify the content by its subject matter. Typically, the control tags are used to identify whether an audio-visual program contain adult subject matter. If these control tags are present, the audio-visual content, optionally, may be made available only after it has been "released" or unlocked by providing an appropriate key. In this manner, parents and other adults may prevent children and adolescents from listening/viewing audio-visual programs with adult subject matter.

The subject method is also beneficial to the users since it provides for a system that easy to use and does not require the user to register, thereby maintaining his anonymity.

Numerous modifications may be made to this invention without departing from its scope as defined in the appended claims.

The invention claimed is:

1. A method of distributing a program, comprising:
   generating a first data portion including a digital file corresponding to said program, said first data portion being readable by a standard player device but unreadable on a general purpose computer;
   generating a second data portion, said second data portion including a digital file containing a compressed version of the program; and
   distributing said first and second data portions to consumers; wherein the consumers can play said program from said first portion only through said standard player device, and wherein said digital file from said second data portion can be processed through a general purpose computer using a software player in accordance with a predetermined set of rules.

2. The method of claim 1 wherein said set of rules is used to determine the number of times the compressed version is played.

3. The method of claim 1 wherein said set of rules is used to determine the number of times the compressed version can be copied.

4. The method of claim 1 wherein said set of rules is used to determine how copies of the compressed version are made.

5. The method of claim 1 wherein said set of rules is used to determine the devices on which said compressed version is allowed to be copied.

6. The method of claim 1 wherein said set of rules is provided in said second data portion.

7. The method of claim 1 wherein said set of rules is updated after distribution of said second data portion.

8. The method of claim 1 wherein said set of rules locks access to the compressed version of the program in response to the presence of a control tag.

9. The method of claim 1 wherein said set of rules unlocks access to the compressed version of the program after a key is provided.

10. The method of claim 1 wherein said second data portion further includes said software player.

11. The method of claim 1 wherein said software player is downloaded over a computer network.

12. The method of claim 1 wherein, said data portion includes a plurality of versions of mid specified software player, each version being configured for a different operating system.

13. The method of claim 1 wherein the standard player device receives said first data portion over a computer network.

14. The method of claim 1 wherein the standard player device receives and reads virtual CDs.

15. The method of claim 1 further comprising recording said data portions on a physical medium and distributing said physical medium.

16. The method of claim 1 wherein said physical medium is selected from a CD, a DVD and other prerecorded medium.

17. The method of claim 1 wherein said data portions are transmitted electronically to said consumers.

18. The method of claim 1 wherein said data portions are downloaded to said consumers.

19. The method of claim 1 wherein said data portions are streamed to said consumers.

20. The method of claim 1 wherein said first data portion is distributed on a physical medium and said second data portion is distributed electronically.

21. The method of claim 1 further comprising encrypting said digital compressed file.

22. A method of distributing multimedia programs comprising:
   generating a first data portion and a second data for said program, said first data portion being arranged to make it playable only by an audio player device, said second data portion including a digital compressed version of the same program, said compressed program being playable by a software program on a general computer in accordance with a set of predetermined rules; and
   distributing said data portions to consumers;
   wherein said consumers can play said first data portion only on a standard player device and said second data portion on a general purpose computer.

* * * * *